US011556888B2

(12) United States Patent
Perez

(10) Patent No.: US 11,556,888 B2
(45) Date of Patent: Jan. 17, 2023

(54) BIOMETRIC AUTHENTICATION TO FACILITATE SHIPMENT PROCESSING

(71) Applicant: United Parcel Service of America, Inc., Atlanta, GA (US)

(72) Inventor: Juan Perez, Milton, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 1018 days.

(21) Appl. No.: 16/237,239

(22) Filed: Dec. 31, 2018

(65) Prior Publication Data

US 2020/0210951 A1    Jul. 2, 2020

(51) Int. Cl.
*G06Q 10/08* (2012.01)
*H04L 9/40* (2022.01)

(52) U.S. Cl.
CPC ..... *G06Q 10/0838* (2013.01); *H04L 63/0861* (2013.01)

(58) Field of Classification Search
CPC .................. G06Q 10/0838; H04L 63/0861
See application file for complete search history.

(56) References Cited

U.S. PATENT DOCUMENTS

| | | | | | |
|---|---|---|---|---|---|
| 5,729,459 A | * | 3/1998 | Brandien | ......... | G07B 17/00193 |
| | | | | | 705/402 |
| 7,818,268 B2 | * | 10/2010 | Fitzsimmons | ..... | G06Q 10/0832 |
| | | | | | 705/401 |
| 8,370,187 B2 | * | 2/2013 | Hilbush | ............. | G06Q 10/0835 |
| | | | | | 705/410 |
| 8,905,304 B1 | * | 12/2014 | Daniel | ............. | G06Q 20/40145 |
| | | | | | 235/380 |
| 10,686,781 B1 | * | 6/2020 | Kaditz | ................... | H04W 12/06 |
| 11,074,572 B2 | * | 7/2021 | Van Os | .............. | G06Q 20/3278 |
| D934,916 S | * | 11/2021 | Caro | ............................ | D14/495 |
| 2002/0083022 A1 | * | 6/2002 | Algazi | ............. | G07B 17/00733 |
| | | | | | 705/408 |
| 2017/0083864 A1 | * | 3/2017 | Saito | ................ | G06Q 10/08345 |
| 2018/0107978 A1 | * | 4/2018 | Drey | .................. | G06Q 10/0837 |
| 2018/0114010 A1 | * | 4/2018 | Van Os | .................... | G06F 21/36 |
| 2019/0050546 A1 | * | 2/2019 | Hochrieser | ............ | G06V 40/16 |
| 2019/0080066 A1 | * | 3/2019 | Van Os | ................ | G06V 40/172 |
| 2019/0334884 A1 | * | 10/2019 | Ross | ........................ | G06F 21/41 |

* cited by examiner

*Primary Examiner* — Thien M Le
*Assistant Examiner* — Asifa Habib
(74) *Attorney, Agent, or Firm* — Shook, Hardy & Bacon, L.L.P.

(57) ABSTRACT

A user request associated with a first user and a shipment of one or more items is received. A prompt that the first user provide one or more biometric identifiers is provided. The prompt selectively excludes a request for billing information from the first user. At least partially in response to the providing of the prompt, at least a first biometric identifier of the first user is obtained. At least partially in response to the obtaining of the first biometric identifier of the first user, the billing information is automatically processed. Based at least in part on the automatically processing of the billing information, the user request associated with the shipment of the one or more items is completed.

20 Claims, 11 Drawing Sheets

US 11,556,888 B2

BIOMETRIC AUTHENTICATION TO FACILITATE SHIPMENT PROCESSING

BACKGROUND

Before parcels or items (e.g., packages, containers, letters, items, pallets, etc.) are transported from an origin to a destination, users typically manually input various sets of information into computer systems to initiate shipment processing. For example, upon a user arriving at a packaging store, existing computer system technologies require users to manually input billing information, such as credit card information, passwords, or other information to ship an item. Existing computer systems also utilize a digital certificate (e.g., a PKI certificate) or digital credentials (e.g., a shared secret such as a passphrase, a private key, etc.) to authenticate and authorize users for completing shipping actions. Embodiments of the present disclosure improve these existing computer systems by overcoming various shortcomings, as described herein.

SUMMARY

Various embodiments of the present disclosure are directed to a computer-implemented method, a system, and a computer program product. In various embodiments, the computer-implemented method includes the following operations. A user request of a first user to ship one or more items is received. At least one first biometric identifier associated with the first user is obtained at a first time. It is determined that the at least one first biometric identifier matches at least a second biometric identifier. The second biometric identifier is registered by the first user at a second time prior to the first time. Based at least in part on the at least one first biometric identifier matching at least the second biometric identifier, a tangible shipping label associated with the one or more items is caused to be printed.

In some embodiments, the system includes at least one first computing device having at least one processor and at least one computer readable storage medium having program instructions embodied therewith. In some embodiments, the program instructions are readable or executable by the at least one processor to cause the system to perform the following operations. A user request associated with a first user and a shipment of one or more items is received. A prompt that the first user provide one or more biometric identifiers is provided. The prompt selectively excludes a request for billing information from the first user. A least partially in response to the providing of the prompt, at least a first biometric identifier of the first user is obtained. At least partially in response to the obtaining of the first biometric identifier of the first user, the billing information is automatically processed. Based at least in part on the automatic processing of the billing information, the user request associated with the shipment of the one or more items is completed.

In some embodiments, the computer program product includes a computer readable storage medium having program instructions embodied therewith. In various embodiments, the program instructions are executable by one or more processors to cause the one or more processors to perform the following operations. At a first time, a first request associated with creating a customer profile for a first user is received. A first biometric identifier of the first user is obtained and customer profile data of the first user is obtained. At a second time subsequent to the first time, a second request associated with shipping one or more items is received. It is determined whether a second biometric identifier matches the first biometric identifier. The second biometric identifier is obtained subsequent to the second request. Based at least on retrieving data within the customer profile data and then determining whether the second biometric identifier matches the first biometric identifier, the second request associated with the shipping of one or more items is completed or denied.

BRIEF DESCRIPTION OF THE DRAWINGS

Figure 1:
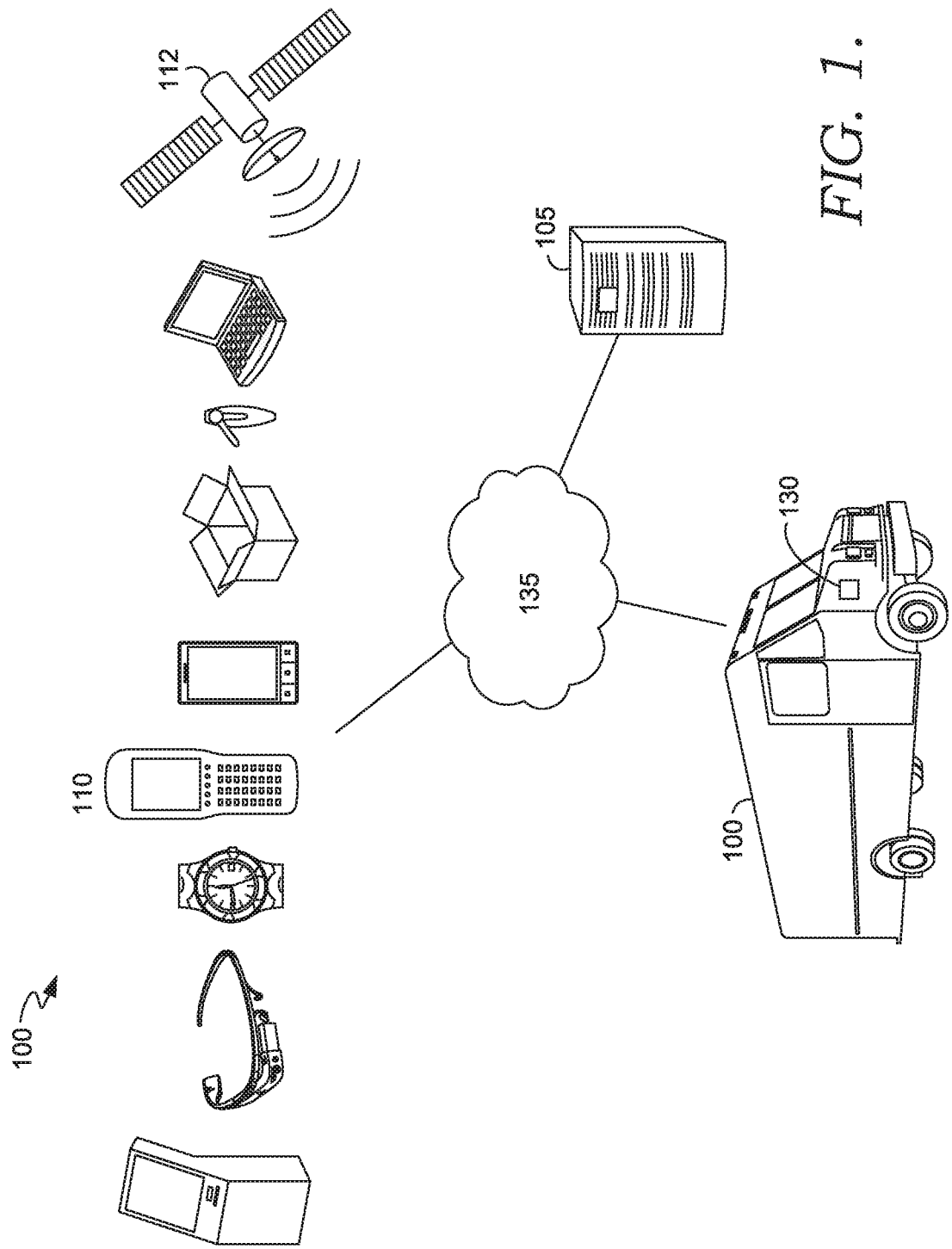

Having thus described the disclosure in general terms, reference will now be made to the accompanying drawings, which are not necessarily drawn to scale, and wherein:

FIG. 1 is a schematic diagram of an example computing environment in which aspects of the present disclosure are employed, according to some embodiments.

Figure 2:
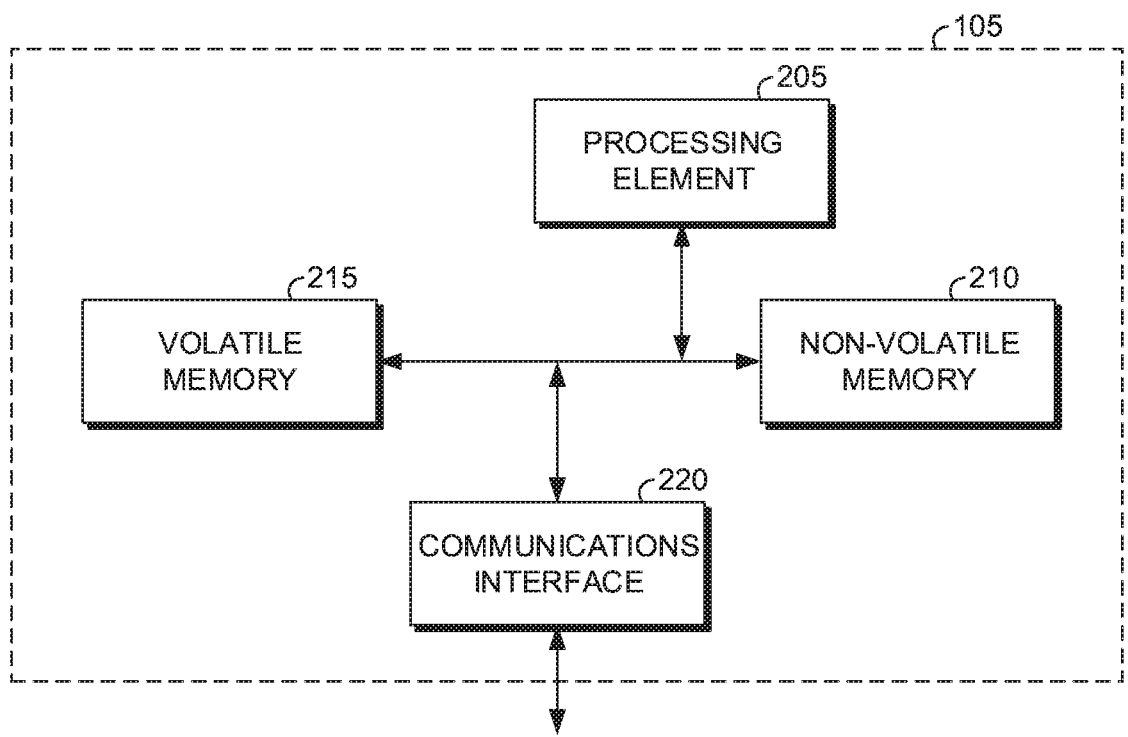

FIG. 2 is a schematic diagram of an analysis computing entity in which aspects of the present disclosure are employed, according to some embodiments.

Figure 3:
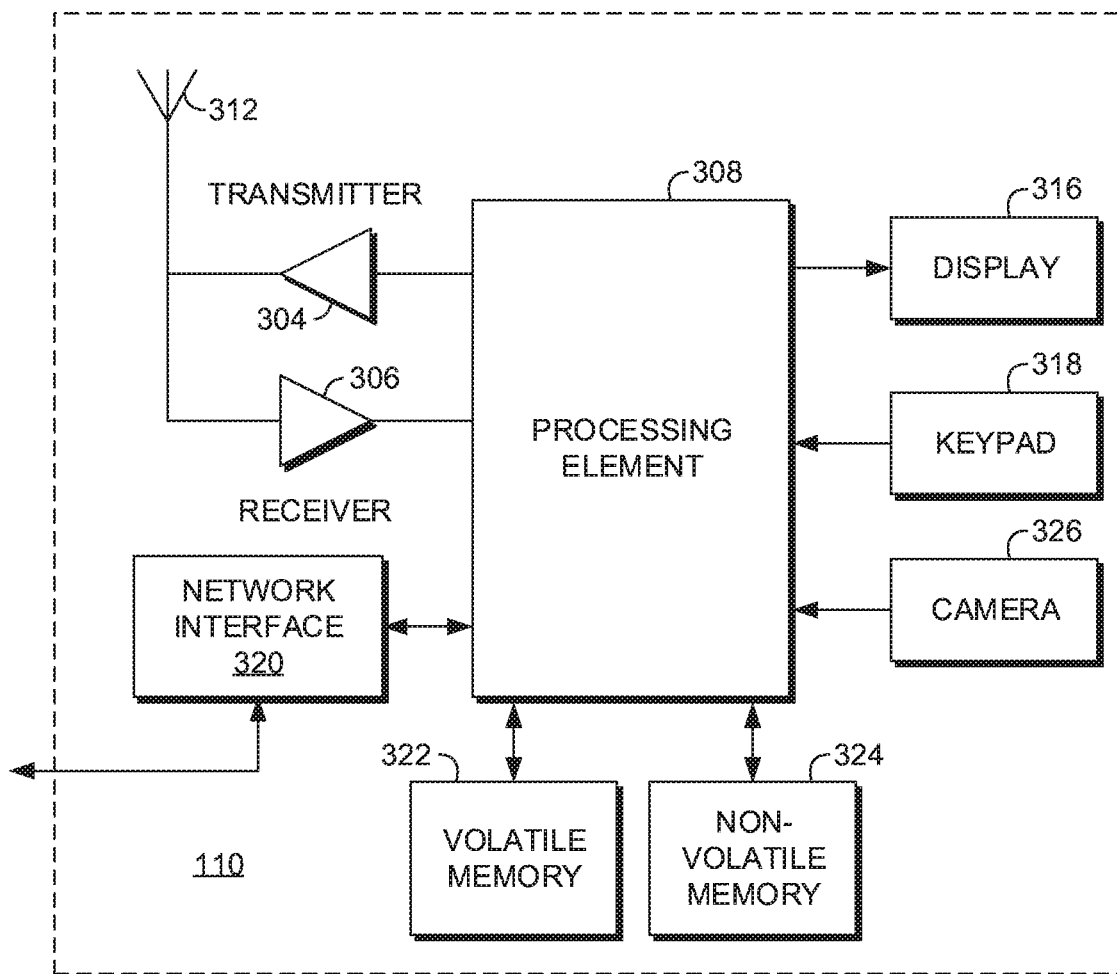

FIG. 3 is a schematic diagram of a computing entity in which aspects of the present disclosure are employed, according to some embodiments.

Figure 4:
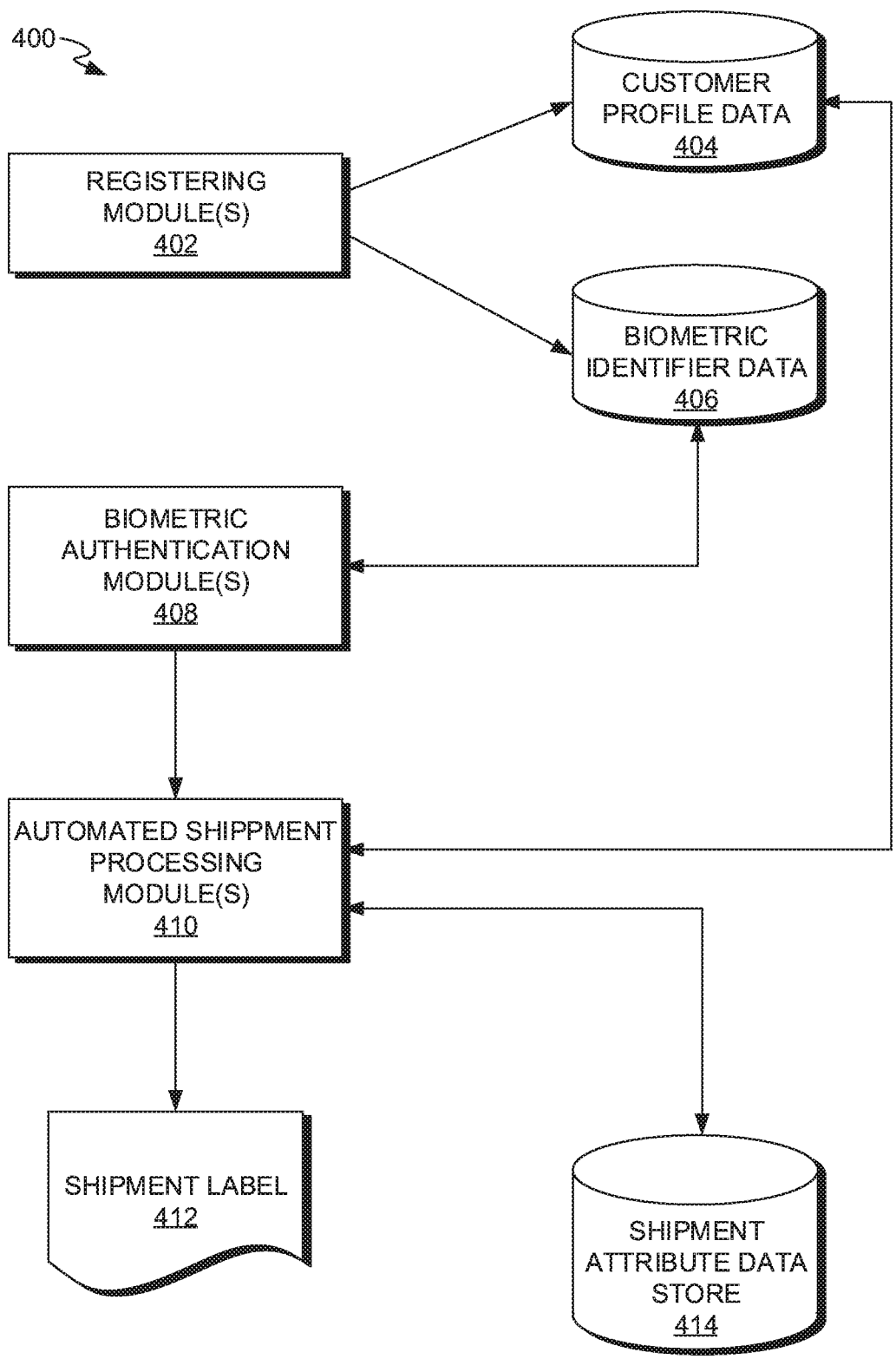

FIG. 4 is a block diagram of an example computing system in which various aspects of the present disclosure are employed, according to some embodiments.

Figure 5:

FIG. 5 is a screenshot of an example user interface or page, according to some embodiments.

Figure 6:
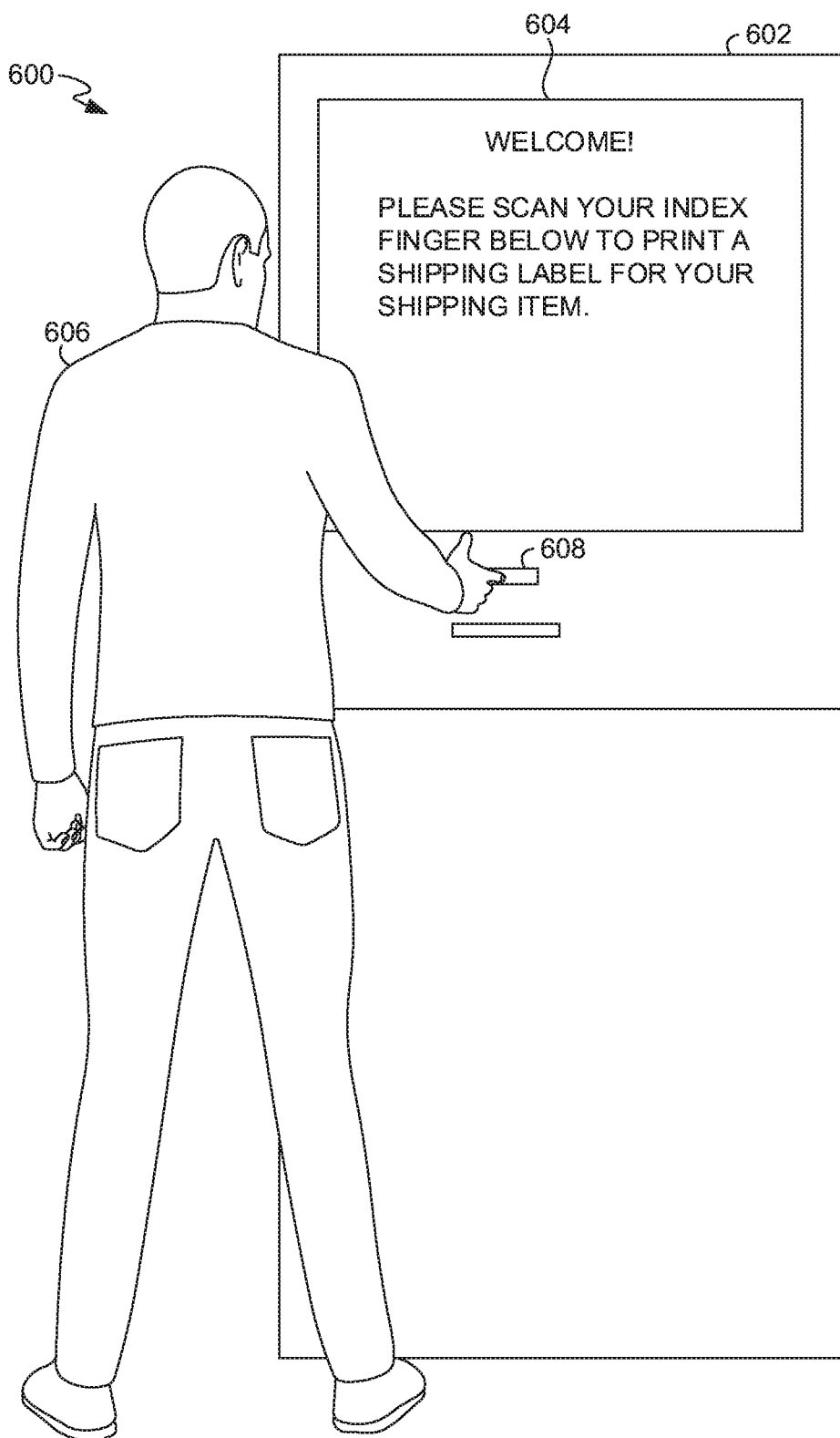

FIG. 6 is a schematic diagram of a shipping environment illustrating a user placing a finger against a fingerprint reader in order to process shipping one or more items, according to some embodiments.

Figure 7:
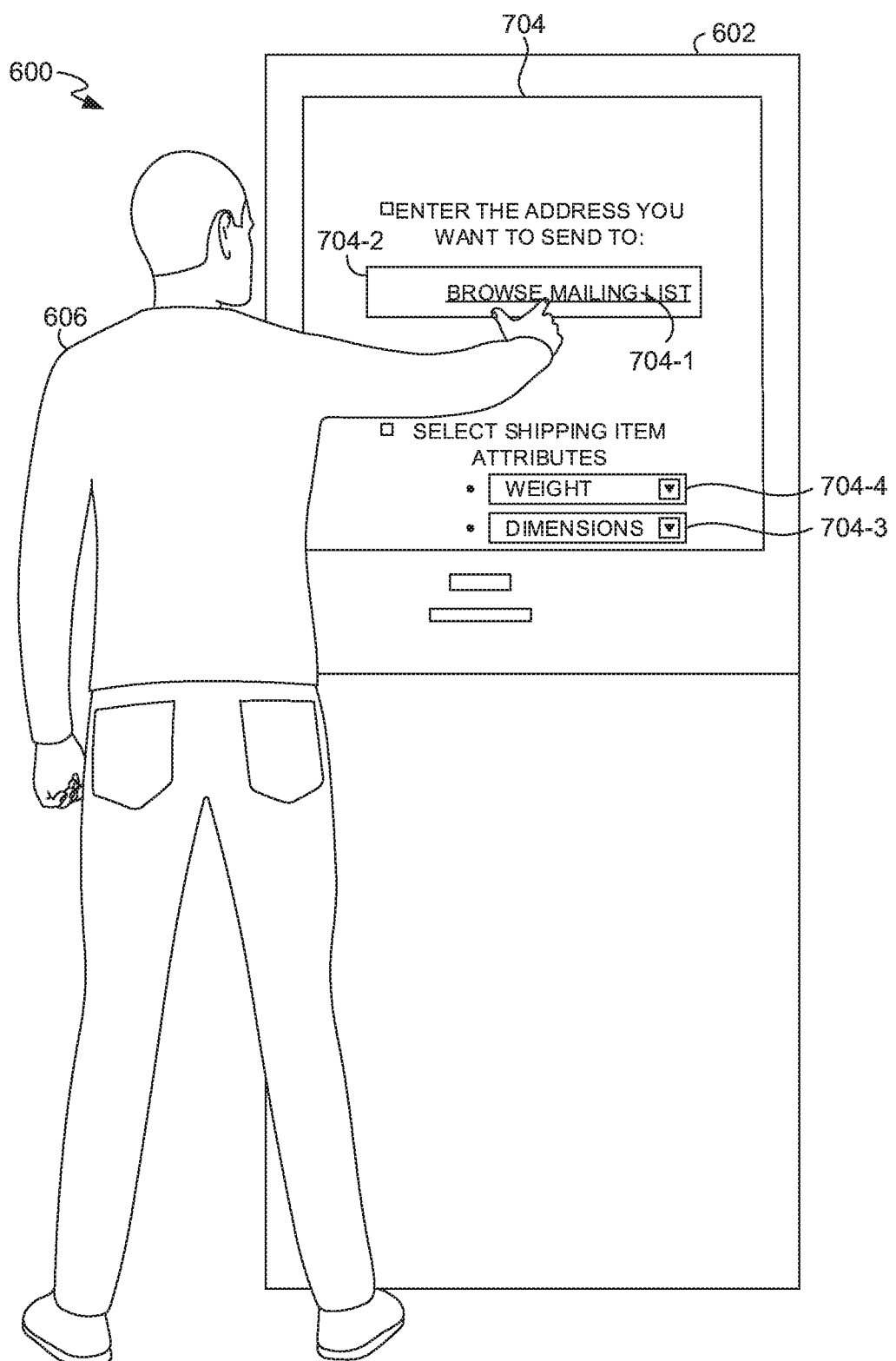

FIG. 7 is a schematic diagram of the shipping environment of FIG. 6 illustrating the user entering information to process shipping one or more items, according to some embodiments.

Figure 8:
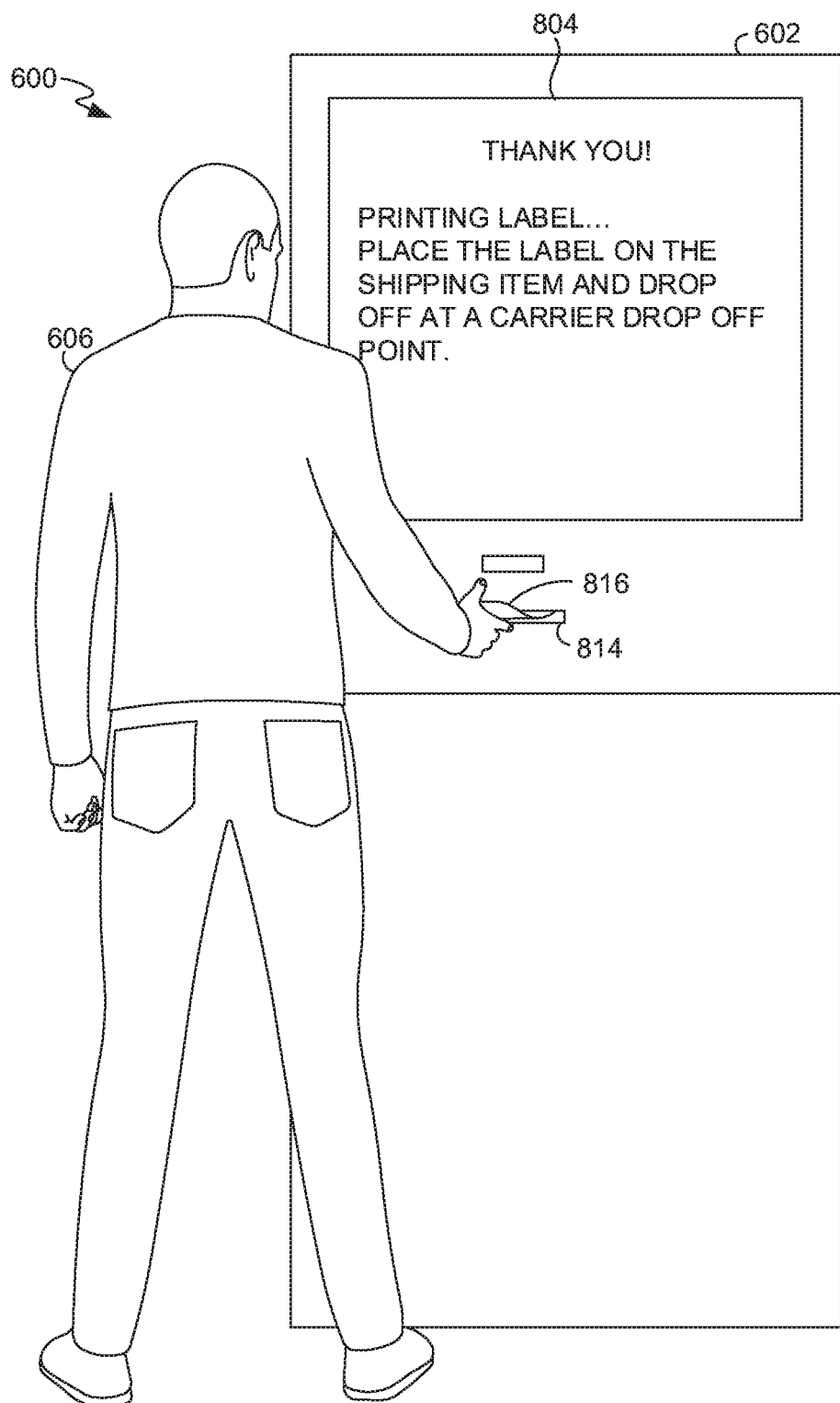

FIG. 8 is a schematic diagram of the shipping environment of FIG. 6 and FIG. 7 illustrating a tangible printing label that is printed, according to some embodiments.

Figure 9:
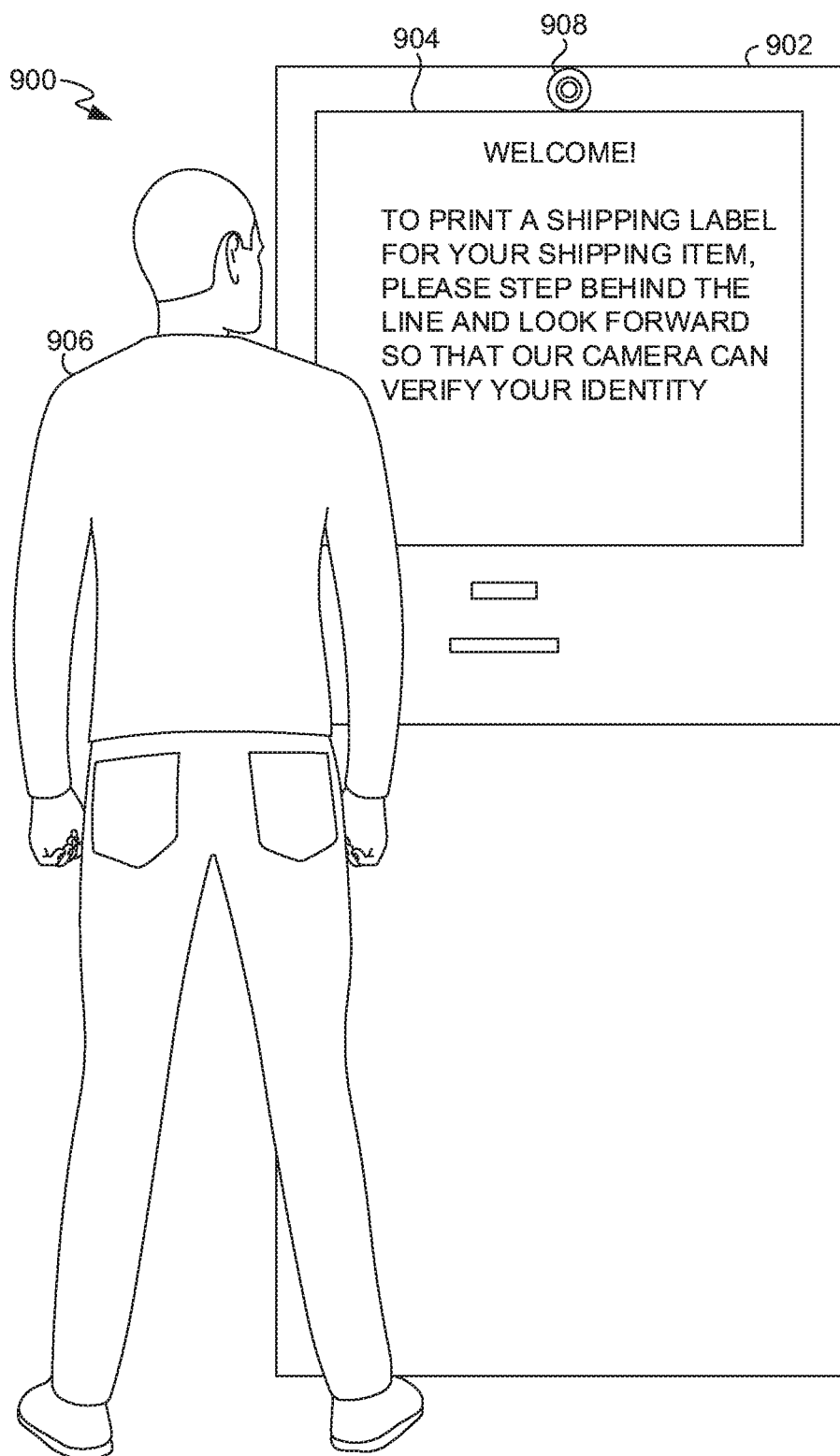

FIG. 9 is a schematic diagram of a shipping environment in which camera recognition algorithms are utilized to authenticate a user, according to some embodiments.

Figure 10:
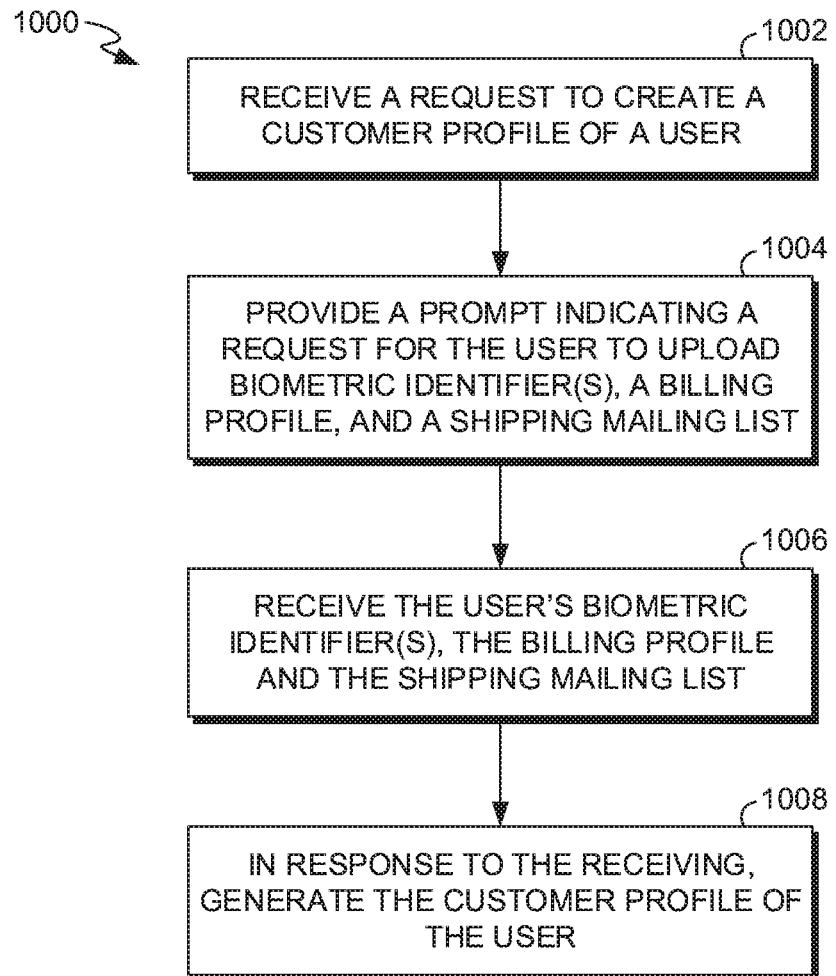

FIG. 10 is a flow diagram of an example process for registering a user by creating a customer profile, according to some embodiments.

Figure 11:
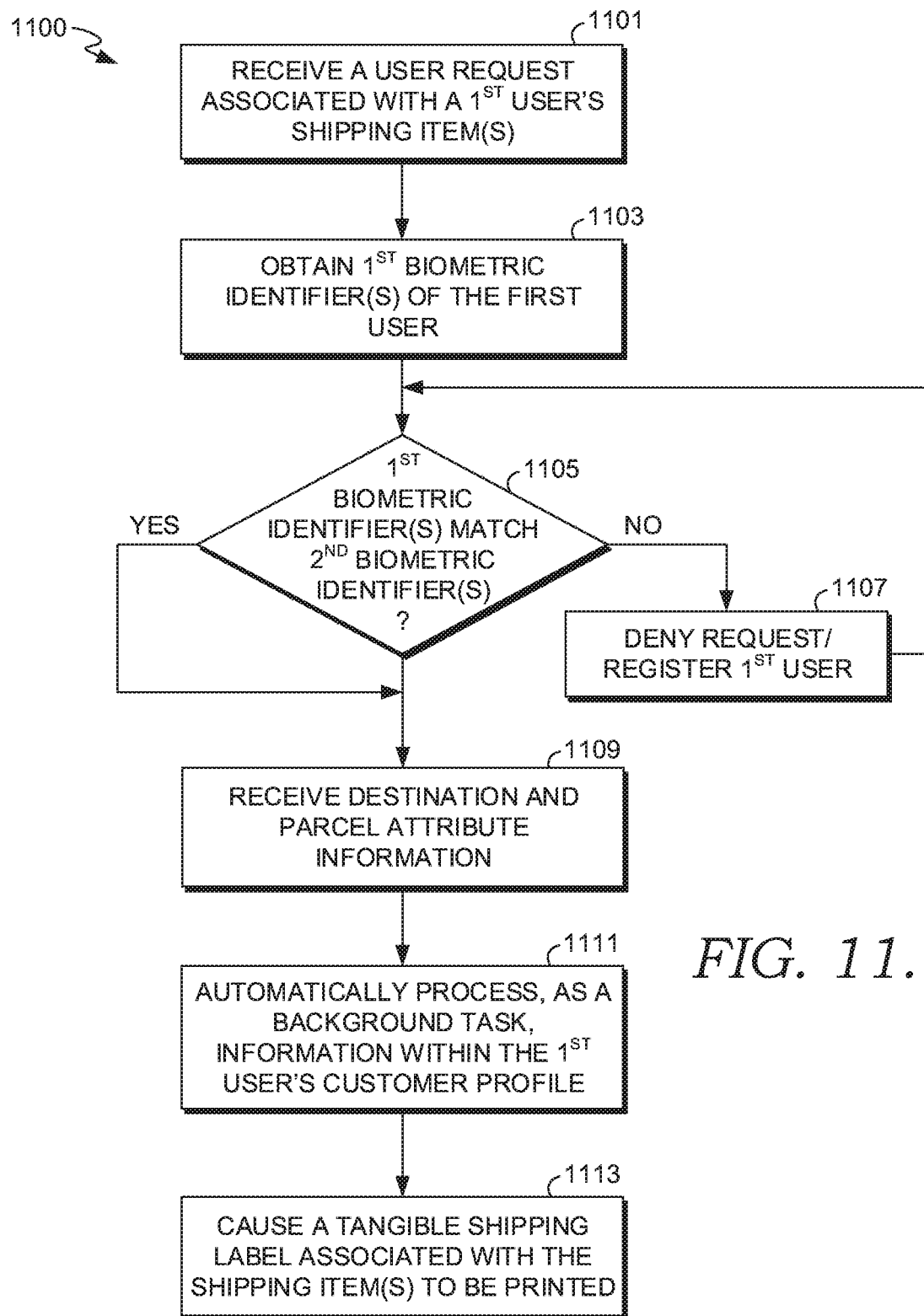

FIG. 11 is a flow diagram of an example process for causing a tangible shipping label associated with one or more shipping items to be printed, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

As described above, existing computing system technologies utilize a digital certificate or digital credentials (e.g., a shared secret such as a passphrase) to authenticate and authorize users for completing shipping actions. However, if these digital certificates or digital credentials of devices are compromised, then any unauthorized rogue device outside of the network can write or read sensitive information. With the rise of particular hacking techniques, such as brute force attacks, these authentication mechanisms are becoming a serious vulnerability for these computer systems. Various embodiments improve these computing systems by authenticating users via one or more biometric identifiers (e.g., automatically scan a retina, face, etc.), which not only removes manual data entry requirements, but provides more robust security than the existing security computing systems. This is because attackers cannot simply guess or use a brute force attack to figure out a biometric identifier. The biometric identifier, such as a unique fingerprint, must be something these attackers must already possess.

Various embodiments of the present disclosure also improve these existing computer technologies via new functionalities that these existing technologies or computing devices do not now employ. For example, some embodiments improve existing software technologies by automating tasks (e.g., processing billing information and/or user credentials) via certain rules (e.g., a user registering information in a customer profile). As described above, such tasks are not automated in various existing technologies and have only been historically performed by manual computer input by humans. In particular embodiments, incorporating these certain rules improve existing technological processes by allowing the automation of these certain tasks, which is described in more detail below. Moreover, manual data entry is particularly tedious and can be error prone. For example, in various instances, users have to stand in a long line at a package store, and before a label is printed for shipping, users have to manually present information, which they may forget. In various instances, users input the wrong information, which causes errors.

Various embodiments of the present disclosure also improve specific computers, such as shipping kiosks and other computing systems located at shipping facilities. For example, existing interactive kiosks and computer systems located in package stores require users to manually input sensitive information, such as passwords and credit card information. However, individuals, such as those standing in line, can peek over the shoulder of users currently using these systems to steal password information, credit card information, etc. In like manner, some of these existing computing systems include pin/touch pads (e.g., to input a password) and credit card readers. However, attackers may utilize mechanisms, such as memory-scraping malware that scrapes tracks from magnetic strips of credit cards to collect credit card information. Attackers may also utilize mechanisms such as brute force methods. For example, attackers may use fingerprint identification lasers to reveal fingerprints. After recording the keys that were touched, the attacker may use brute force methods to derive password sequences, which may take a short amount of time, particularly for systems that only require four-digit passwords or pin numbers.

Various embodiments improve these existing systems by either not employing card readers or pin pads at all (e.g., because credit card information and password information is processed automatically as a background task via prior registration) or supplementing these features with functionality described herein that does not require manual entry of information and automatically processes shipment processes via biometric identifiers.

Existing computing system technologies also employ functionality that require users to manually input billing information, such as credit card information and passwords, to ship an item. However, not only does this waste valuable time, but various computing resources are unnecessarily consumed. For example, repetitive clicks, selections, or manual data entry in these systems increase storage device I/O (e.g., excess physical read/write head movements on non-volatile disk) and network utilization. This is because each time a user inputs this information, such as inputting passwords and billing information, the computing system has to traverse a network and reach out to a storage device to perform a read or write operation. This is time consuming, error prone, leaves less bits available to be transmitted for a particular time slice (i.e., there is reduced bandwidth), and can eventually wear on components, such as a read/write head. Reaching out to disk is also very expensive because of the address location identification time and mechanical movements required of a read/write head. Further, when users repetitively issue queries, it is expensive because processing multiple queries consumes a lot of computing resources. For example, an optimizer engine of a database manager module calculates a query execution plan (e.g., calculates cardinality, selectivity, etc.) each time a query to locate password/billing information is issued. This requires a database manager to find the least expensive query execution plan to fully execute the query. Most database relations contain hundreds if not thousands of records. Repetitively calculating query execution plans on this quantity of records decreases throughput and increases network latency.

Various embodiments improve resource consumption in computing systems (e.g., disk I/O and network utilization). Particular embodiments selectively exclude or do not require a request for a user to manually enter information, such as billing and password information. Because users do not have to keep manually entering information or selections, storage device I/O is reduced, more bits are available to be transmitted for a particular time slice, and query optimizers are not as often utilized, which allows for a reduction in computing query execution plans and thus increased throughput and reduced network utilization. For example, in particular embodiments, as soon as a user is authenticated, the system automatically searches within a customer profile data store to locate all necessary information (e.g., passwords, destination addresses, billing information). The system then goes out to disk a single time (as opposed to multiple times for each set of information) to obtain all of this information. Accordingly, the disk read/write head in various embodiments reduces the quantity of times it has to go to disk to read records, which reduces the likelihood of read errors and breakage of the read/write head.

II. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example computing environment 100 in which aspects of the present disclosure are employed in, according to some embodiments. As shown in FIG. 1, this particular computing environment 100 includes one or more manual delivery vehicles 100, one or more analysis computing entities 105, one or more computing entities 110, one or more satellites 112, one or more networks 135, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various embodiments, the manual delivery vehicle 100 includes one or more telematics sensor devices 130. The telematics sensor devices 130 sample various attributes of the manual delivery vehicle 100, such as speed, location (e.g., via a GPS module), fuel consumption, and/or any other suitable type attributes of the manual delivery vehicle 100 and transmit the data to the analysis computing entity 105 for analysis.

1. Exemplary Analysis Computing Entities

FIG. 2 provides a schematic of an analysis computing entity 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the analysis computing entity 105 may include or be in communication with one or more processing elements 205 (also referred to as processors, processing circuitry, and/or similar terms used herein interchangeably) that communicate with other elements within the analysis computing entity 105 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the analysis computing entity 105 may further include or be in communication with non-volatile media (also referred to as non-volatile storage, memory, memory storage, memory circuitry, and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In particular embodiments, the analysis computing entity 105 may further include or be in communication with volatile media (also referred to as volatile storage, memory, memory storage, memory circuitry, and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 205 and operating system.

As indicated, in particular embodiments, the analysis computing entity 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 105 may include or be in communication with one or more input elements, such as a keyboard input, a mouse input, a touch screen/display input, motion input, movement input, audio input, pointing device input, joystick input, keypad input, and/or the like. The analysis computing entity 105 may also include or be in communication with one or more output elements (not shown), such as audio output, video output, screen/display output, motion output, movement output, and/or the like.

As will be appreciated, one or more of the analysis computing entity's 100 components may be located remotely from other analysis computing entity 105 components, such as in a distributed system. Furthermore, one or more of the components may be combined and additional components performing functions described herein may be included in the analysis computing entity 105. Thus, the analysis computing entity 105 can be adapted to accommodate a variety of needs and circumstances. As will be recognized, these architectures and descriptions are provided for exemplary purposes only and are not limiting to the various embodiments.

2. Exemplary Source Computing Entities

Source computing entities 110 may be configured for registering one or more users (e.g., FIG. 10), processing one or more shipping requests (e.g., FIG. 11), and/or for operation by a user (e.g., a vehicle operator, delivery personnel, customer, and/or the like). In certain embodiments, source computing entities 110 may be embodied as handheld computing entities, such as mobile phones, tablets, personal digital assistants, and/or the like, that may be operated at least in part based on user input received from a user via an input mechanism. Moreover, source computing entities 110 may be embodied as onboard vehicle computing entities, such as central vehicle electronic control units (ECUs), onboard multimedia systems, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, source computing entities 110 may be utilized as onboard controllers for UAVs configured for picking-up and/or delivering packages to various locations, and accordingly, such source computing entities 110 may be configured to monitor various inputs (e.g., from various sensors) and generate various outputs. It should be understood that various embodiments of the present disclosure may comprise a plurality of source computing entities 110 embodied in one or more forms (e.g., kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a source computing entity 110 that may include one or more components that are functionally similar to those of the analysis computing entity 105. FIG. 3 provides an illustrative schematic representative of a source computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Source computing entities 110 can be operated by various parties, including carrier personnel (sorters, loaders, delivery drivers, network administrators, and/or the like). As shown in FIG. 3, the source computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the source computing entity 110 additionally includes other components not shown, such as the fingerprint reader 608 of FIG. 6, a printer associated with the printing interface 814 of FIG. 8, and/or the camera 908 of FIG. 9.

The signals provided to and received from the transmitter 304 and the receiver 306, respectively, may include signaling information in accordance with air interface standards of applicable wireless systems. In this regard, the source computing entity 110 may be capable of operating with one or more air interface standards, communication protocols, modulation types, and access types. More particularly, the source computing entity 110 may operate in accordance with any of a number of wireless communication standards and protocols, such as those described above with regard to the analysis computing entity 105. In a particular embodiment, the source computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the source computing entity 110 may operate in accordance with multiple wired communication standards and protocols, such as those described above with regard to the analysis computing entity 105 via a network interface 320.

Via these communication standards and protocols, the source computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The source computing entity 110 can also download changes, add-ons, and updates, for instance, to its firmware, software (e.g., including executable instructions, applications, program modules), and operating system.

According to particular embodiments, the source computing entity 110 may include location determining aspects, devices, modules, functionalities, and/or similar words used herein interchangeably. For example, the source computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the source computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The source computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the source computing entity 110 to interact with and/or cause display of information from the analysis computing entity 105, as described herein. The user input interface can comprise any of a number of devices or interfaces allowing the source computing entity 110 to receive information/data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the source computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the source computing entity 110 may also include a camera, imaging device, and/or similar words used herein interchangeably 326 (e.g., still-image camera, video camera, IoT enabled camera, IoT module with a low resolution camera, a wireless enabled MCU, and/or the like) configured to capture images. The source computing entity 110 may be configured to capture images via the onboard camera 326, and to store those imaging devices/cameras locally, such as in the volatile memory 322 and/or non-volatile memory 324. As discussed herein, the source computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata associated with the image data that may be accessible to various computing entities 110.

The source computing entity 110 may include other input mechanisms, such as scanners (e.g., barcode scanners), microphones, accelerometers, RFID readers, and/or the like, configured to capture and store various information types for the source computing entity 110. For example, a scanner may be used to capture parcel/item/shipment information/data from an item indicator disposed on a surface of a shipment or other item. In certain embodiments, the source computing entity 110 may be configured to associate any captured input information/data, for example, via the onboard processing element 308. For example, scan data captured via a scanner may be associated with image data captured via the camera 326 such that the scan data is provided as contextual data associated with the image data.

The source computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the source computing entity 110. As indicated, this may include a user application that is resident on the entity or accessible through a browser or other user interface for communicating with the analysis computing entity 105 and/or various other computing entities.

In another embodiment, the source computing entity 110 may include one or more components or functionalities that are the same or similar to those of the analysis computing entity 105, as described in greater detail above. As will be recognized, these architectures and descriptions are provided for exemplary purposes only and are not limiting to the various embodiments.

3. Exemplary Computing System

FIG. 4 is a block diagram of an example computing system 400, in which various aspects are employed, according to some embodiments. In particular embodiments, some or each of the components illustrated in the system 400 represent separate physical computing device hosts. For example, the registering module(s) 402 is included in a first physical host device, and the biometric authentication module(s) 408 and/or the automated processing module(s) 410 are included in a second and/or third physical host device. In this manner, the computing system 400, in various embodiments, represents a distributed computing system, such as a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over a network (e.g., the network 135).

In some embodiments, however, some or each of the components illustrated in the system 400 are included in the same physical host device or set of host devices. For example, in particular embodiments, the registering module(s) 402, the biometric authentication module(s) 408, and the automated shipment processing module(s) 410 are all program modules located in the analysis computing entity 105 of FIG. 1. Although the computing system 400 describes specific components at a specific quantity, it is understood that any combination of the components and quantity may exist. For example, in some embodiments, the computing system 400 includes another module corresponding to a banking ledger system host configured to verify an account holder's credit card or other billing information in order to process a shipment.

The registering module(s) 402 registers a user by receiving and storing customer profile data 404 and biometric identifier data 406. According to some embodiments, registering includes inserting records in a database and/or creating an account for a user. A "customer profile" as described herein includes data particular to a specific user and that is used to engage in or complete a shipping process (e.g., send a package to a destination address) for the specific user. For example, a customer profile or the customer profile data 404 may be or include one or more user IDs, usernames, passwords, billing information (e.g., credit card number, billing address, etc.), biometric identifiers, mailing lists, and other specific shipping information (e.g., specific item to be shipped, type of shipping (e.g., priority, 2-day, 1 week, etc.), recipients of package, etc.). In an example illustration, as soon as a user logs into a portal, the user may select a button on a graphical user interface (GUI) that causes display and prompts the user to generate an account by entering information necessary to store in a customer profile, such as generating a username, password, biometric identifier, credit card information, etc.

A "biometric identifier" as described herein is a unique identifier that indicates some behavioral, physiological, physical, and/or other biological characteristic of a living being (e.g., a human) and is specific to only that being (or a small set of beings, such as an immediate family member). Biometric identifiers, as described herein, are utilized to authenticate and/or authorize specific users or beings in order to complete a request associated with shipping one or more items (e.g., print a tangible shipping label). A biometric identifier can be or include a digital human fingerprint identifier of a user, a facial recognition identifier of a user, a retinal identifier of a user, a finger geometry identifier of a user, vein identifier of a user, an iris identifier of a user, a voice recognition identifier of a user, a gait pattern identifier of a user, a DNA identifier of a user, a gesture identifier of a user, and/or any other suitable biometric identifier.

A "retinal identifier" identifies a retinal blood vessel pattern in a being's eye. A "finger geometry identifier" identifies the size and/or position of human fingers at registration time. For example, a scanner sensor may scan a human's hand with only the index and pinky fingers extended, while the other fingers are not extended. Accordingly, when a user has to authenticate, he or she has to place his/her fingers in the same position. A "vein identifier" identifies a vein pattern in any portion of a being's body, such as on the top of a human hand. An "iris identifier" identifies the pattern in the iris of the eye, which surrounds the pupil. A "voice recognition identifier" identifies pitch or other sound variation patterns that are unique to specific humans. A "gait pattern identifier" identifies a being's movement pattern. For example, a user may pronate his or her foot at heel strike at a particular angle when walking. This pronation may be included in the gait pattern identifier. A "DNA identifier" identifies a particular sequence of DNA of a particular user. A "gesture identifier" identifies any user gesture, such as a tapping of feet in a certain way, raising of hands, etc.

The registering module(s) 402 registers one or more biometric identifiers of one or more users, which are included in the biometric identifier data 406. In some embodiments, the biometric identifier data 406 is also included in the customer profile data 404. In an example illustration of registering one or more biometric identifiers, in addition to the user uploading his/her name, address, credit card information, etc., he or she may be prompted to upload a biometric identifier. For example, the user's mobile device (e.g., the source computing entity 110) may include a fingerprint reader device or application that is configured to scan and store a human fingerprint(s) locally to the mobile device. Accordingly, from an application that prompts the user to register biometric data, the user may browse his or her mobile device, identify the human fingerprint(s), and upload it to the system 400 such that it is stored among the biometric identifier data 406 for that particular user. In various embodiments, the customer profile data 404 and the biometric identifier data 406 are stored to a single data store, such as a database.

The biometric authentication module(s) 408 authenticates and/or authorizes particular users for shipping one or more items. This may include allowing a request to continue or denying a request associated with shipping one or more items, such as printing a tangible shipping label. As illustrated in the system 400, the biometric authentication module(s) 408 queries the biometric identifier data 406 in a data store to determine whether a current biometric identifier matches one of the identifiers within the biometric identifier data 406 provided at registration time. For example, a first user may have uploaded his or her first human digital fingerprint to the system 400, such that the registering module(s) 402 stores the first digital fingerprint among the biometric identifier data 406. The first user may then, at a later time, request a shipping label to be printed or otherwise ship one or more items. In response to this request, the biometric authentication module(s) 408 may prompt the first user to scan his or her fingerprint again (a second digital fingerprint). In response to the scan of the second digital fingerprint, the second digital fingerprint is compared to the first fingerprint stored for the first user as indicated in the customer profile data 404 and/or biometric identifier data 406. Because there is a match, the request continues to be processed via the automated shipment processing module(s) 410. In some situations, however, there is not a match of fingerprints or other biometric identifiers. In this situation, either the request can be denied and/or a user is prompted to register for an account, which includes receiving and storing suitable data to the customer profile data 404 and the biometric identifier data 406.

The automated shipment processing module(s) 410 completes a request via processing data within the customer profile data 404 and the shipment attribute data store 414. For example, in response to the user being authenticated and authorized according to the biometric authentication module(s) 108, the automated shipment processing module(s) 410 automatically extracts, as a background task, data from the customer profile data 404, such as credit card information to complete the request. A "background task" or an "automatic" operation as described herein is any process, thread, function, etc. that automatically occurs without an explicit user request. For example, the user does not have to manually input credit card information in response to requesting to ship one or more items. Rather, in response to the request to ship one or more items, the system 400 automatically extracts this information from the customer profile data 404, which was provided at registration time. In this way, the user does not have to input billing information, password information, or any other information at request time in order to avoid the problems as described herein.

In some embodiments, the automated shipment processing module(s) 410 queries the attribute data store 414 in order to obtain shipment item information (e.g., weight and dimensions of a package to be shipped). For example, in response to a user request to ship one or more items, the shipment automated processing module(s) 410 can cause display of a GUI that has selectable fields so that the user can select the weight and/or dimension information of the package to be shipped. In response to the user selection of this information, the selection is mapped to price or other information that is used to generate a shipment label. For example, the shipment attribute data store 414 may include a database of different weights and other dimensions and associated prices to ship based on the weight and other dimensions.

The output in various embodiments of the system 400 is the printing of the tangible shipping label 412. In response to the automated shipment processing module(s) 410 automatically processing data within the customer profile data 404 and the shipment attribute data store 414, the automated shipment processing module(s) 410 causes the shipping label 412 to be printed. A "tangible shipping label" is a physical medium (e.g., paper, adhesive, cardstock, etc.) that includes indicia relevant to ship an item. For example, the tangible shipping label can include indicia describing: type of shipments (e.g., "priority delivery 2-day"), originating address, destination address, name of consignee/consignor, bar code(s) (e.g., for tracking an item), description of a shipment item (e.g., brand X sunglasses), weight/dimensions of the item(s) to be shipped, one or more dates (e.g., date to be delivered), and/or any other suitable information. Some or each of this information can be obtained within the customer profile data 404 and/or user selections subsequent to a user request to ship one or more items, as described in more detail below.

IV. EXEMPLARY SYSTEM OPERATION

FIG. 5 is a screenshot 500 of an example user interface or page, according to particular embodiments. In various embodiments, the screenshot 500 represents an app page or web page with GUI features. A web page can be or include browser-based page (e.g., HTML) that is linked to other pages (e.g., to form a website) and accessed over the internet. An app page is an application page (e.g., an activity in an ANDROID operating system) that is typically installed within a device, as opposed to being rendered within a browser like a web page. A server (e.g., the analysis computing entity 105) may provide an app or web page, over a network, to one or more user devices (e.g., the source computing entity 110). In this way, the user may input information for registration (e.g., by the registering module(s) 402 within the customer profile data 404 and the biometric identifier data 406).

The screenshot 500 represents the onboarding or registering of a particular user (e.g., via the registering module(s) 402). During registration, the user may input information within the source computing entity 110. Responsive to the information being entered, the information is sent over the network 135 to the analysis computing entity 105 and stored within the customer profile data 404 and the biometric identifier data 406 in some embodiments. The screenshot 500 is a page that it is displayed to the source computing entity 110 at registration time in various embodiments. The screenshot 500 includes various fields, such as a "name" field, an "email" field, a "user ID" field, and a "password" field. Accordingly, the user can input his or her name in the name field, email address in the email field, user ID (e.g., username) in the user ID field, and password in the password field.

Additionally, the user can select the link 501 in order to upload his or her human digital fingerprint. It is understood that although the link 501 is used for storing fingerprint biometric identifiers, any link describing any biometric identifier (e.g., facial recognition identifier, retinal identifier, etc.) as described herein can replace or be included within the screenshot 500. The feature 501-1 is configured to provide a textual explanation for why a fingerprint is uploaded in response to its selection. For example, in response to the user selecting the feature 501-1, a popup window is provided that says "upload your index fingerprint now in order to automatically process future shipping actions without effort!" In response to a user selection of the "browse" link 502, the operating system provides a window for a user to look in different directories or folders in the operating system for already downloaded biometric identifier(s) stored on the local device that displays the screenshot 500 (e.g., the source computing entity 110). In response to the user selecting the biometric identifier(s) stored to the local device, the system (e.g., the registering module(s) 402) uploads the biometric identifier(s) (e.g., to the biometric identifier data 406). A "feature" as described herein as it relates to user interfaces is or includes: a button, an icon, a link, a plugin, and/or any other suitable user interface selection element.

In some embodiments, in response to a user selection of the "upload fingerprint" link 501, a popup window is displayed that gives instructions for users to download one or more fingerprints (and/or other biometric identifiers) on their local devices. For example, the instructions may include one or more URL links, third party plugins, and/or app identifiers that point to specific biometric scanning software tools. Such tools extract biometric identifiers from users. For example, in some embodiments, the particular tools may instruct a user to take a close-up picture image (e.g., via a mobile phone) of his thumb. The application (provided as a link within the instructions) may request and provide a digital mapping of each line and contour of the thumb as shown in the picture image to make a fingerprint identifier image. Effectively, this means that the image of the thumb in the picture is traced with more prominent lines to make a biometric identifier.

In some embodiments, computing entities (e.g., source computing entity 110) already include a physical biometric scanner of some sort. In these situations, the screenshot 500 includes directions on how to obtain biometric identifiers. For example, in response to a user selection of the link 501, the system can provide a prompt asking whether the user's mobile device has a fingerprint reader. If the user selects "no," the system can provide links or other software application tools as described above that allow the user to download biometric identifiers without the need of a physical biometric reader. If the user selects "yes," the system may provide a prompt that asks for the operating system of the device the user is using. Based on the OS selected, the system provides instructions to the user. For example, the instructions may include requesting that the user swipe his or her index finger over a scanner (e.g., an optical scanner). In response to the swiping, the OS may store the biometric identifier(s) to the local device within memory. This way the user may browse (e.g., via selection of the feature 501-2) the local device to upload the biometric identifier(s) (e.g., to the analysis computing entity and the customer profile data 404).

When a user selects the "create a credit card profile" link 503, the user can upload credit card information for future processing of any shipments. Specifically, in response to a selection of the link 503, the screenshot 500 displays a window or other feature that includes fields that are configured to receive user input of a credit card number, mailing address, credit card codes, and/or any other suitable billing information that a user utilizes to pay for future shipments (e.g., expiration date of credit card, routing check number, etc.). In response to the selection of the feature 503-1, indicia is displayed to the screenshot 500, which describes how the credit card profile will be used in the future. For example, there may be a description that in any future shipment transaction, the user will not have to manually provide credit card information, but rather, the user simply provides a biometric identifier, and the information input to the "create credit card profile" link 503 will be processed in the background to complete the shipment.

When a user selects the "create/import mailing list" link 505, the user can upload one or more potential destination addresses for future shipment actions. These addresses are also described as a "shipping destination list" herein. The shipping destination list includes one or more potential destination addresses for shipping one or more items to. In response to a user selection of the link 505, a set of fields are displayed that are configured to receive user input of addresses (e.g., home/business) that are candidates to receive one or more shipments from the user in particular embodiments. In some embodiments, the user selects a feature that allows the user to sync or import addresses from other applications (e.g., MICROSOFT EXCEL). In response to a selection of the feature 505-1, indicia is displayed to the screenshot 500, which describes how creating or importing will be used in the future. For example, there may be a description that in any future shipment transaction, the user will not have to manually provide shipment addresses at shipment time, but rather, the user simply provides a biometric identifier and selects an address uploaded in the "create/import mailing list" link 505 to process a shipment.

In various embodiments, the screenshot 500 is a single page of an overall application that includes various functionalities. Such functionality can include generating and displaying delivery alerts (e.g., the source computing entity 110 receives notification from the analysis computing entity 105 via text or email the day before delivery). Functionality can also additionally or alternatively include generating and displaying a calendaring tool, which allows users to track all deliveries by date. Functionality can additionally or alternatively include a tool that calculates estimated delivery time (e.g., clock time and/or date of delivery). Functionality can additionally or alternatively include an automated authorization tool (e.g., a user selects a field that triggers automatic recipient authorization) that allows a carrier service to deliver parcels without a signature for drop-off when the recipient of the parcel will not be at the destination drop off location to sign. Functionality can additionally or alternatively include one or more fields that are configured to receive user input designating where to leave parcels, such as a particular location at an address or a particular address (e.g., "leave with my neighbor at address X."). Functionality can additionally or alternatively include processing a request that a carrier entity deliver one or more parcels to a carrier facility or retail location (as opposed to a home address) for pickup of the one or more parcels. Functionality can additionally or alternatively include processing a user selection for confirming an hourly delivery window of when one or more parcels will be delivered (e.g., a 2 hour delivery window, such as "package will be delivered between 1 p.m. and 3 p.m."). In various embodiments, the application functionality can be or include any functionality within carrier applications, such as "UPS MY CHOICE" created by United Parcel Service, Inc., of Atlanta, Ga.

FIG. 6 is a schematic diagram of a shipping environment 600 illustrating a user 606 placing a finger against a fingerprint reader in order to process shipping one or more items, according to particular embodiments. In some embodiments, the computing device 602 represents the source computing entity 110 of FIG. 1/FIG. 3 and vice versa. In some embodiments, the computing device 602 represents an interactive kiosk within a carrier facility environment (e.g., a carrier shipping store, an access point, a locker, etc.). An interactive kiosk is a computer terminal that includes specialized hardware (e.g., fingerprint reader, camera, pin pad, label printer) and software that provides access to information. In some embodiments, however, the computing device 602 represents any suitable computing device, such as a desktop computing device. A "shipping store" may be a location where the transition or handoff of item(s) occurs between individuals that want to ship the item(s) and carrier personnel that handle and ship the item(s) to their destination point(s). Shipping stores can include item packaging (e.g., envelopes and boxes) and other products for sale. An "access point" is any non-shipping store location, such as a third party retailer location, that is used for shipping items. These access points may be near a consignor's home or business address. In some embodiments, the analysis computing entity 105 causes display or provides the indicia as represented within the computing device 602. It is understood that although the computing device 602 is illustrated as including a fingerprint reader 608, other biometric readers can alternatively or additionally be included, such as a retinal scanner, a camera for gait analysis, an iris scanner, etc.

In operation, the user 606 proceeds through the shipping environment 600, such as a shipping store, with one or more items he or she wishes to ship and arrives at the computing device 602. In various embodiments, the screen 604 is a default home screen that is provided, which reads "Welcome! Please scan your index finger below to print a shipping label for your shipping item." Accordingly, when the user 606 swipes or otherwise places his or her index finger over the fingerprint reader 608, a user request to ship one or more items is generated and transmitted to the analysis computing entity 105. In some embodiments, however, the screen 604 is not a default home page but is rather a second or additional page provided in response to a user selecting a feature associated with shipping one or more items. In some embodiments, there is a requirement of a multi-factor authentication (MFA) as opposed to a single authentication requirement. MFA requires more than one method of authentication from independent or different sources to verify the user's identity. For example, in some embodiments, not only must the user 606's fingerprint be used to identify the user, but other credentials, such as a password or other biometric identifier (e.g., retinal scan, vein scan) is used.

The fingerprint reader 608 is or includes any suitable fingerprint reader, such as an optical scanner, capacitive scanner, ultrasound/ultrasonic scanner, thermal line scanner, or any combination thereof. Fingerprint readers identify and create a mapping of each groove, ridge, and mark of the anterior surface of a finger (assuming anatomical position). For example, a capacitive scanner generates a pixel image of ridges and grooves that makeup a fingerprint via electrical signals. Specifically, these devices utilize capacitor circuits to collect data of a fingerprint. Capacitors store electrical charge so connecting them to conductive plates of a surface of a scanner allows them to be used to track details of a fingerprint. For example, in response to a user placing his finger over or against the reader 608, the charge stored in a capacitor will be different for a ridge of a finger, as opposed to a groove or gap. Each of these changes are mapped and stored as biometric identifiers.

In various embodiments, in response to the user 606 placing his or her finger against the reader 608, various information (e.g., authentication) is processed as a background task. For example, referring back to FIG. 4, the biometric authentication module(s) 408 may compare the biometric identifier (a first biometric identifier) received from the scanning of the user's 606 finger to the biometric identifier data 406 (which include a second set of biometric identifiers). For example, the biometric authentication module(s) 408 compares the first biometric identifier to each biometric identifier stored among the biometric identifier data 406. If there is a match, the process may continue, such as providing the screen 704 of FIG. 7. If there is not a match, then the request associated with shipping one or more items may be denied, or the screen 604 may display a message indicative of a request for the user 606 to register his or her fingerprint before continuing. Accordingly, in these situations, the first identifier data is stored among the biometric identifier data 406.

FIG. 7 is a schematic diagram of the shipping environment 600 of FIG. 6 illustrating the user 606 entering information to process shipping one or more items. In some embodiments, FIG. 7 represents a second subsequent time after a user is authenticated via submitting a biometric identifier. For example, in response to the user 606 placing his or her finger on the reader 608 and the system (e.g., biometric authentication module(s) 408) verifying the user's 606 identity, the screen 704 is caused to be displayed. Although the screen 704 illustrates specific data input requirements (e.g., mailing addresses, weight of parcels, etc.), it is understood that this is representative only. Accordingly, other information can alternatively or additionally be required or displayed within the screen 704, such as a field configured to receive user input indicating the name of the item to be shipped, so that it can be printed on a shipping label. Other examples include type of shipments, name of consignee/consignor, description of a shipment item, one or more dates and/or any other suitable information.

The screen 704 illustrates that a user may select the destination address(es) he/she wishes the item(s) to be shipped to and various attributes associated with the item(s). The first set of indicia reads "enter the address you want to send to:" The user 606 can either manually enter or type in an address within the field 704-2 or select the "browse mailing list" link 704-1. The link 704-1 points to a shipping destination list. In various embodiments, the shipping destination list includes one or more potential destination addresses for shipping one or more items that the user 606 uploaded to the system at registration time. For example, referring back to FIG. 5, the shipping destination list can be made when registering in response to the user selecting the "create/import mailing list" 505 link. In these embodiments, each of the addresses generated at registration time can be displayed to the screen 704 such that the user 606 can select one of the addresses. For example, in response to the user selecting the "browse mailing list" link 704-1, the analysis computing entity 105 causes display of a feature within the screen 704, such as a popup window, that includes each address in a destination list that was already registered (e.g., within the customer profile data 404 via the registering module(s) 402). In response to receiving the user selection of the address within the destination list, the computing device 602 and/or the analysis computing entity 105 stores the address in order to process a shipment, such as print a shipping label.

In some embodiments, an address is not within a shipping destination list. In these embodiments, the user can manually enter or type in an address. For example, instead of selecting an address in the destination list via the "browse mailing list" 704-1 link, the user 606 can simply manually enter a different address within the field 704-2.

The second set of data within the screen 704 displays indicia that reads, "select shipping item attributes." This allows the user 606 to select the weight and/or dimensions of the item(s) he or she wishes to ship via the features 704-2 (e.g., a dropdown arrow) and/or 704-3. In response to causing display of these features within the screen 704, a selection of the feature 704-2 is received. The feature 704-2 indicates a selected weight of one or more items. Accordingly, in response to a received selection of the feature 704-2, various weight ranges or values are displayed (e.g., 1-5 lbs., 6-10 lbs., 11-15 lbs., etc.) and the user 606 selects one of the ranges or values. In an example illustration, in response to a selection of the feature 704-2, which may be a dropdown arrow, a window of weight ranges is displayed. In response to receiving a selection of one of the weight ranges, the analysis computing entity 105 and/or the computing system 602 stores the selected weight range for further processing (e.g., automatically processing credit card information). In various embodiments, the analysis computing entity 105 and/or the computing device 602 stores a data structure that generates a mapping of each selected weight range with a price to ship (e.g., 1-5 lbs.=15 dollars).

In some embodiments, the feature 704-3 is not included in the display 704 such that only the weight is selected. In other embodiments, when a selection from the user 606 is received via the feature 704-3, the screen 704 displays dimension ranges, such as length, width, and/or height ranges of item(s) that the user 606 will ship. In various embodiments, the analysis computing entity 105 and/or the computing device 602 stores a data structure that generates a mapping of each selected dimension range with a price to ship (e.g., length of 12 in. to 20 in.=15 dollars).

It is understood that the computing device 602 can alternatively or additionally include other mechanisms to determine or scan weight or other item attributes. For example, the computing device 602 can include a scale to determine weight or an optical camera that determines length, width, and/or height dimensions. In an illustration, the screen 704, in some embodiments, includes a message that prompts a user to place a shipment item on a scale such that the system can determine the weight of the item.

In various embodiments, in response to receiving user selection(s) within some or each feature within the screen 704, various information (e.g., billing information) is processed as a background task. For example, the automated shipment processing module(s) 410 automatically process data within the customer profile data 404 (e.g., credit card information) in response to the computing device 602 and/or the analysis computing entity 105 receiving weight and/or dimension selections via the features 704-2 and 704-3. In a specific illustration, in response to the user 606 selecting a particular weight value (e.g., 5 lbs), the particular weight value may be transmitted from the computing device 602, over the network 135, to the analysis computing entity 105. The analysis computing entity 105 then generates a mapping, as described above, to associate the weight value with a corresponding price. In response to the mapping, the analysis computing entity 105 then obtains billing information (e.g., within the customer profile data 404) and initiates a communication session with a bank ledger computing entity (e.g., over a wireless network) in order to verify that the user 606 is indeed the owner of the associated account and has the credit or funds available as indicated via the generation of the mapping. For example, if the weight value selected was 5 pounds, and the mapping indicates that 5 pound items costs 30 dollars, the analysis computing entity 105 or the computing device 602 processes this exact amount via the bank ledger. Identical or similar functionality can alternatively or additionally occur via received selection of the feature 704-3.

FIG. 8 is a schematic diagram of the shipping environment 600 of FIG. 6 and FIG. 7 illustrating a tangible printing label that is printed. In some embodiments, FIG. 8 represents a third subsequent time after a user has entered in the address and weight/dimension information of FIG. 7 and/or biometric identifiers (e.g., as described in FIG. 6). For example, in response to receiving the selections of a destination address and a weight for the one or more items to be shipped via the screen 704, various processing occurs (e.g., processing billing information) and the screen 804 is caused to be displayed after the processing.

The screen 804 reads "Thank You! Printing label . . . place the label on the shipping item and drop off at a carrier drop off point." The printer interface 814 dispenses the tangible shipping label 816, at which point the user 606 may take the shipping label 816, place it on the associated shipping item, and drop it off at a carrier location to ship the item to a destination. In various embodiments, the shipping label 816 includes one or more predetermined destination addresses, as selected via the "browse mailing list" 704-1 link. In some embodiments, the shipping label includes a destination address that is not within a shipping destination list (e.g., via a selection of the "browse mailing list" link 704-1), but was entered manually via a field (e.g., the field 704-2). As described above, the tangible shipping label can alternatively or additionally include other information, such as a weight (e.g., as selected via the feature 704-2) of the item to be shipped, name of item to be shipped (e.g., as entered into the screen 704 of FIG. 7), type of shipments (e.g., as entered into the screen 704 of FIG. 7), name of consignee/consignor (e.g., as entered into the screen 704 of FIG. 7), one or more dates, and/or any other suitable type of information.

In various embodiments, before a printer within the computing device 602 prints the shipping label 816, it extracts information or is presented with a digital copy of the label 816. The digital copy is generated via various manual and automated selections made, such as described above. For example, in response to the user selecting one or more destination addresses or other information, the computing device 602 stores the selections in memory as a digital copy of the label 816. In another example, the computing system 602 automatically generates a timestamp of the printing that is printed on the tangible shipping label 816.

FIG. 9 is a schematic diagram of a shipping environment 900, in which camera recognition algorithms are utilized to authenticate the user 906. FIG. 9 illustrates that a computing device, such as a kiosk, can alternatively or additionally include other particular biometric readers to authenticate a user compared to only a fingerprint reader as illustrated in FIG. 7. Although the shipping environment 900 includes specific information (e.g., the screen 904) associated with specific components (e.g., the camera 908), it is understood that the computing device 902 can alternatively or additionally include other information and components. (e.g., a retinal scanner, a vein scanner, etc.). Functionality described with respect to FIG. 9 in various embodiments is the same functionality as described with reference to FIG. 7, except that the biometric identifier that is derived from the user is one or more photographic images or image sequences of a user derived from the camera 908.

The screen 904 reads "Welcome! To print a shipping label, for your shipping item, please step behind the line and look forward so that our camera can verify your identity." Accordingly, the user 906 steps behind a line, and the camera 908 captures one or more images of the user 906. In some embodiments, the camera 908 captures a still digital photograph of a portrait of the user 906 and compares the digital photograph to other images (e.g., within the biometric identifier data 406) that have been registered. Responsively, some or each of the functionality described with respect to FIG. 7 and/or FIG. 8 is identically performed in particular embodiments. In some embodiments, however, the camera 908 does not just capture a single digital photograph of the user 906, but captures a sequence of images (e.g., a video sequence) in order to authenticate a user. For example, the camera 908 may capture various images that indicate a gait or other pattern of the user 906.

FIG. 10 is a flow diagram of an example process 1000 for registering a user by creating a customer profile, according to particular embodiments. The process 1000 (and/or any of the functionality described herein (e.g., process 1100)) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product as described herein may perform or be caused to perform the processes 1000, 1100, and/or any other functionality described herein.

Per block 1002, a request to create (or a request associated with creating) a customer profile of a user is received. For example, in some embodiments, a user can open a client application, such as a web browser, and input a particular Uniform Resource Locator (URL) corresponding to a particular website or portal. In response to receiving the user's URL request, an entity, such as the analysis computing entity 105 may provide or cause to be displayed to a user device (e.g., a source computing entity 110), a home or landing page. In response to a user selection of a login or sign up feature, the screenshot 500 is displayed in particular embodiments. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the views represent an aspect of a locally stored application, such that a computing device hosts the entire application and consequently the computing device does not have to communicate with other devices (e.g., the analysis computing entity 105) to retrieve data.

Per block 1004, a prompt is provided indicating a request for the user to upload one or more biometric identifiers, a billing profile, a shipping mailing list or any combination thereof. The uploading may be for processing future shipments, such as printing future shipping labels. For example, referring back to FIG. 5, the screenshot 500 is the prompt in various embodiments. In some embodiments, the prompt alternatively or additionally requests that the user upload other information, such as a username and password, and/or biometric identifiers of one or more other users who are authorized to be the recipients of one or more shipping items.

Per block 1006, the user's one or more biometric identifiers, the billing profile, and the shipping mailing list are received. For example, the user may upload information as described with reference to FIG. 5 and/or via the registering module(s) 402 of the customer profile data 404 and the biometric identifier data 406. In an example illustration, the user may upload one or more fingerprints, credit card information, and input destination address candidates for future shipping actions.

In some embodiments, the system stores, prior to receiving a user request to ship items, a plurality of fingerprints, where each fingerprint of the plurality of fingerprints correspond to a biometric identifier of a different respective person in order for the respective person to be a candidate to receive one or more items at a destination point (e.g., a shipping destination address) in a shipping route. For example, in some embodiments, a screenshot, such as the screenshot 500 includes a feature that includes one or more fields that are configured to receive user input of phone numbers or email addresses of potential shipping recipients. In response to the user registering (e.g., block 1008), the system (e.g., the analysis computing entity 105) sends a notification via the appropriate channels (e.g., SMS text) associated with the phone numbers or email addresses indicating that the user has selected them to be a candidate recipient. The notification may include instructions describing how to upload one or more biometric identifiers, which may be the same instructions as described with reference to a selection of the feature 501-1 of FIG. 5. Accordingly, in response to these candidate recipients uploading one or more biometric identifiers, they are transmitted and stored (e.g., to the analysis computing entity) for the processing of one or more future shipment actions.

In an example illustration of how registration of different fingerprints is used, after the first user's shipping label is printed per block 1113, the user may place the label on a shipping item and provide the item to carrier personnel. Carrier personnel driving the manual delivery vehicle 100 may carry the shipping item through a shipping route to a destination address included in the shipping label. At the destination point, carrier personnel may be carrying a mobile device, such as a DIAD, and responsively request that the recipients provide their fingerprints to receive the items. Accordingly, in response to the recipient user placing his or her fingers on the mobile device, the mobile device scans (e.g., via a capacitive scanner) the recipient user's finger and compares the biometric identifier to biometric identifiers stored at registration time (e.g., within the biometric identifier data 406). If there is a match, then the recipient user can be permitted to obtain possession of the package. If there is not a match, then the recipient user is not allowed to have the package.

In some embodiments, different biometric identifier instances of the same type are stored, where each instance represents authentication and authorization for a user to engage in a particular workflow task and not engage in other workflow tasks. Accordingly, each instance corresponds to a different biometric identifier of the same type, and also corresponds to a unique workflow task. A "workflow task" as described herein is privileged access for one or more users to access particular resources (e.g., files, networks, etc.) or perform specific actions (e.g., download particular applications). For example, in some embodiments, the system stores, within a customer profile for the first user, different fingerprint identifiers corresponding to different fingers of the first user. The "type" of biometric identifier is fingerprints in this situation and the "instance" is various fingerprints of different fingers of the same user. Each of the different fingerprint identifiers corresponding to authentication for a particular workflow task (e.g., printing a shipping label) that is different from any other workflow task (e.g., track a shipping item). Accordingly, a request (e.g., to print a shipping label) can be denied or allowed to proceed based on determining that the registered biometric identifier matches an identifier to perform a particular workflow task.

In another example, the system stores, within the customer profile for the first user, different facial identifiers corresponding to different facial expressions of the first user. Each of the different facial identifiers correspond to authentication and authorization for a particular workflow task that is different from any other workflow task. Accordingly, a request (e.g., to print a shipping label) can be denied or allowed to proceed based on determining that the registered facial identifier matches another facial identifier to perform a particular workflow task.

A workflow task that requires authentication of a biometric identifier instance may be or include the following actions or tools in particular embodiments: printing shipping labels, generating and displaying delivery alerts, accessing a calendaring tool (which allows users to track all deliveries by date), accessing an automated authorization tool that allows a carrier service to deliver parcels without a signature for drop-off when the recipient of the parcel will not be at the destination drop off location to sign, accessing one or more fields that are configured to receive user input designating where to leave parcels, such as a particular location at an address or a particular address, a request that a carrier entity deliver one or more parcels to a carrier facility or retail location (as opposed to a home address) for pickup of the one or more parcels, and/or a user selection for confirming an hourly delivery window of when one or more parcels will be delivered (e.g., a 2 hour deliver window, such as "package will be delivered between 1 p.m. and 3 p.m.).

Per block 1008, in response to the receiving of the user's one or more biometric identifiers, the billing profile, and/or the shipping mailing list, the customer profile is generated.

For example, referring back to FIG. 4, the registering module(s) 402 registers the customer profile data 404, the biometric identifier data 406, and/or any of the information described with reference to block 1006 (e.g., workflow task biometric identifier instances) for a particular user.

FIG. 11 is a flow diagram of an example process 1100 for causing a tangible shipping label associated with one or more shipping items to be printed, according to some embodiments. In some embodiments, the process 1100 occurs in response to the process 1000 of FIG. 10 after a user has already been registered. Per block 1101, a user request associated with a first user shipping one or more items is received. The user may input information on a computing device, such as select a button, or perform one or more actions (e.g., place his or her finger over a fingerprint reader) to issue the user request. For example, referring back to FIG. 6, the user 606 places his or her index finger over the reader 608, at which point the computing device 602 receives the biometric identifier(s) and transmits a request to the analysis computing entity 105. The analysis computing entity 105 then receives the user request to ship one or more items.

A computing device (e.g., the computing device 602, 110, or the analysis computing entity 105) provides a prompt (e.g., displayed indicia requesting a user to perform an action) that the first user provide one or more biometric identifiers. In various embodiments, the prompt selectively excludes a request for billing and/or other information (e.g., password credentials) from the first user to complete the user request. To "selectively exclude" can be or include one or more functionality operations that do not occur or provide certain information, as these operations or information have already been performed or obtained. For example, referring back to FIG. 6 and FIG. 7, none of the screens 604 or 704 display or are caused to be displayed (e.g., by the analysis computing entity 105) any information that request billing or password information. This is because the first user may have already registered this information (e.g., via the process 1000 of FIG. 10).

Per block 1103, one or more first biometric identifiers of the first user are obtained. Per block 1105, it is determined (e.g., by the analysis computing entity 105) whether the first biometric identifier(s) match a second set of biometric identifier(s). For example, referring back to FIG. 4, in response to the user providing some action (e.g., placing his finger over a fingerprint reader), the biometric authentication module(s) 408 obtains the first biometric identifier and compares it to the biometric identifier data 406 to determine if any of the biometric identifiers in the biometric identifier data 406 match the first biometric identifier.

Per block 1107, if there is no match at block 1105, in some embodiments, the user request is denied. For example, denying the request can be or include preventing of a printing of a tangible shipping label for shipping the one or more items or preventing one or more workflow tasks as described herein. In some embodiments, however, a prompt is additionally or alternatively provided to the first user requesting that the first user register his or her biometric information and other information (e.g., credit card information, password, etc.). Accordingly, in response to the user registering information, the decision at block 1105 will likely be a yes, which means that the process 1100 continues to block 1109.

One or more of the biometric identifiers in the data 406 may be the same or substantially the same (e.g., include a ~90% match) as the obtained first biometric identifier per block 1105. This means that the first user has already registered (e.g. provided fingerprints, billing information, or other information described in FIG. 10). Accordingly, per block 1109, the system (e.g., the automated shipment processing module(s) 410) provides and receives destination information (e.g., a destination address) and parcel attribute information (e.g., weight, length, height, and/or width of a parcel). For example, referring back to FIG. 7, in response to the user authenticating per FIG. 6, the screen 704 is displayed. The system then receives user selections associated with the weight and/or dimensions of the item(s) needing to be shipped.

Per block 1111, the system (e.g., the automated shipment processing module(s) 410) automatically processes, as a background task, information within the first user's customer profile. For example, billing information that was entered in response to a user login prior to the receiving of the user request at block 1101 is processed. In these situations, the user does not provide the billing information after issuing the user request at block 1101. In another example, password and credit card information that was entered in response to a user login prior to receiving the user request at block 1101 is additionally or alternatively automatically processed at block 1111. Alternatively or additionally, information input via the block 1109 is processed, such as the weight or other dimensions of the one or more items to be shipped. This processing may occur in order to associate the shipment action with a particular cost in order to processing the billing information. The automation functionality with respect to block 1111 is any of the automated functionality described herein in embodiments. For example, the biometric authentication module(s) 808/automated shipment processing module(s) 410 performing the described functions, and/or any of the automated processing that occurs before the screen 804 is caused to be displayed to the computing device 802 of FIG. 8 can include the automated functionality at block 1111.

Per block 1113, a tangible shipping label associated with the one or more shipping items are caused to be printed (e.g., by the analysis computing entity and/or the computing device 602). In some embodiments, however, the printing of the tangible shipping label alternatively or additionally includes completing the user request at block 1101 in other ways. For example, the system (e.g., the analysis computing entity 105) can complete the user request by transmitting a digital shipping label to a user device (e.g., the source computing entity 110) so that the user can print the shipping label instead of a kiosk, for example. Alternatively or additionally, the completion of the user request includes notifying a user that he or she is free to engage in a particular workflow task, as described herein.

In various embodiments, the causing of the tangible shipping label to be printed or otherwise completing (or denying) the user request is based on automatically processing of the information contained in the customer profile and/or other information at block 1111. For example, in various embodiments, the printing of the tangible label is not printed unless the user provides a matching biometric identifier (block 1105) and the system has automatically processed billing and other information in the customer profile.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the analysis computing entity 105 may "cause" a message to be displayed to a source computing entity 110 (e.g., via transmitting a message to the user device) and/or the same source computing entity 110 may "cause" the same message to be displayed (e.g., via a processor that executes instructions and data in a display memory of the user device). Accordingly, one or both systems may in isolation or together "cause" the effect of displaying a message.

V. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A system comprising:
   at least one computing device having at least one processor; and
   at least one computer readable storage medium having program instructions embodied therewith, the program instructions readable or executable by the at least one processor to cause the system to:
   receive a user request to ship one or more items, the user request being associated with a first user;
   in response to the receiving of the user request, provide a prompt that instructs the first user to provide one or more biometric identifiers, the prompt selectively excluding a request for billing information from the first user; and
   subsequent to the providing of the prompt, obtain at least a first biometric identifier of the first user;
   in response to the obtaining of the first biometric identifier of the first user, automatically process the billing information without causing a read of a card via a card reader;
   based at least in part on the automatically processing of the billing information, complete the user request associated with the shipment of the one or more items.

2. The system of claim 1, wherein the program instructions further cause the system to selectively exclude a request for password credentials for the first user for the completing of the user request.

3. The system of claim 1, wherein the completing of the user request causes a tangible shipping label associated with the one or more items to be printed, and wherein the causing the tangible shipping label to be printed occurs in response to the automatically processing of the billing information.

4. The system of claim 1, wherein the program instructions further cause the system to process, in response to the user request, password and credit card information that was entered in response to a user login prior to the receiving of the user request.

5. The system of claim 1, wherein the program instructions further cause the system to:
   receive, prior to the receiving of the user request to ship the one or more items, a shipping destination list, the shipping destination list includes a plurality of potential destination addresses for shipping the one or more items;
   cause, subsequent to the receiving of the user request, display of the shipping destination list; and
   receive, in response to the causing of the display, an input of an address that is not in the shipping destination list, wherein the printed tangible shipping label includes the address.

6. The system of claim 1, wherein the program instructions further cause the system to store, prior to the receiving of the user request, a plurality of fingerprints, each fingerprint of the plurality of fingerprints correspond to a biometric authentication identifier of a different respective person in order for a respective person to be a candidate to receive the one or more items at a destination point in a shipping route.

7. The system of claim 1, wherein the program instructions further cause the system to:
receive, prior to the user request, a second request to create a customer profile of the first user; and
in response to the second request, providing a prompt indicating a request for the first user to upload the billing information and mailing lists for future shipping actions.

8. A computer program product comprising a computer readable storage medium having program instructions embodied therewith, the program instructions executable by one or more processors to cause the one or more processors to:
receive, at a first time, a first request associated with creating a customer profile for a first user,
based on a prompt for the first user to provide a first biometric identifier, register the user first by obtaining the first biometric identifier of the first user and obtaining customer profile data of the first user;
receive, at a second time subsequent to the first time, a second request associated with shipping one or more items;
determine whether a second biometric identifier matches the first biometric identifier, the second biometric identifier being obtained subsequent to the second request; and
based at least in part on retrieving data within the customer profile data without causing a read of a card via a card reader and the determining whether the second biometric identifier matches the first biometric identifier, completing or denying the second request associated with the shipping of the one or more items.

9. The computer program product of claim 8, wherein the denying the second request includes preventing a printing of a tangible shipping label for shipping the one or more items.

10. The computer program product of claim 8, wherein the program instructions further cause the one or more processors to:
cause, subsequent to the receiving of the second request, display of shipping item attributes; and
receive, in response to the causing of the display, a selection of a first identifier and a dropdown arrow feature, the first identifier indicates a selected weight of the one or more items, the selection of the dropdown arrow feature causes weight ranges to be displayed, wherein indicia is printed on the tangible shipping label based in part on the selected first identifier being selected.

11. The computer program product of claim 8, wherein the program instructions further cause the one or more processors to automatically process, subsequent to the receiving of the second request and as a background task, information contained in the customer profile, wherein the completing or denying the second request is further based on the automatically processing credit card information contained in the customer profile.

12. The computer program product of claim 8, wherein the second request corresponds to a request to engage in a first workflow task, wherein the program instructions further cause the one or more processors to:
store, within the customer profile for the first user, different fingerprint identifiers corresponding to different fingers of the first user, wherein each of the different fingerprint identifiers correspond to authentication for a particular workflow task that is different from any other workflow task; and
deny the second request based on determining that the first biometric identifier does not match an identifier to perform the first workflow task, wherein the first biometric identifier does match an identifier to perform another task of the particular workflow tasks.

13. The computer program product of claim 8, wherein the program instructions further cause the one or more processors to store a plurality of fingerprints to the customer profile, each fingerprint of the plurality of fingerprints correspond to a biometric authentication identifier of a different person of a plurality of persons, wherein each person of the plurality of persons is a candidate to receive the one or more items at a destination point in a shipping route.

14. A computer-implemented method comprising:
receiving, at a first time, a first request associated with creating a customer profile for a first user,
based on a prompt for the first user to provide a first biometric identifier, registering the user first by obtaining the first biometric identifier of the first user and obtaining customer profile data of the first user;
receiving, at a second time subsequent to the first time, a second request associated with shipping one or more items;
determining whether a second biometric identifier matches the first biometric identifier, the second biometric identifier being obtained subsequent to the second request; and
based at least in part on retrieving data within the customer profile data without causing a read of a card via a card reader and the determining whether the second biometric identifier matches the first biometric identifier, completing or denying the second request associated with the shipping of the one or more items.

15. The computer-implemented method of claim 14, wherein the denying the second request includes preventing a printing of a tangible shipping label for shipping the one or more items.

16. The computer-implemented method of claim 14, further comprising:
causing, subsequent to the receiving of the second request, display of shipping item attributes; and
receiving, in response to the causing of the display, a selection of a first identifier and a dropdown arrow feature, the first identifier indicates a selected weight of the one or more items, the selection of the dropdown arrow feature causes weight ranges to be displayed, wherein indicia is printed on the tangible shipping label based in part on the selected first identifier being selected.

17. The computer-implemented method of claim 14, wherein the program instructions further cause the one or more processors to automatically process, subsequent to the receiving of the second request and as a background task, information contained in the customer profile, wherein the completing or denying the second request is further based on the automatically processing credit card information contained in the customer profile.

18. The computer-implemented method of claim 8, wherein the second request corresponds to a request to engage in a first workflow task, wherein the computer-implemented method further comprising:
storing, within the customer profile for the first user, different fingerprint identifiers corresponding to different fingers of the first user, wherein each of the different fingerprint identifiers correspond to authentication for a particular workflow task that is different from any other workflow task; and denying the second request based on determining that the first biometric identifier does not match an identifier to perform the first workflow task, wherein the first biometric identifier does match an identifier to perform another task of the particular workflow tasks.

19. The computer-implemented method of claim 14, wherein the first biometric identifier includes one or more identifiers from a list of identifiers consisting of: a digital human fingerprint of the first user, a facial recognition identifier of the first user, a voice recognition identifier of the first user, and a retinal identifier of the first user.

20. The computer-implemented method of claim 14, wherein the completing of the second request includes processing billing information that was entered in response to a user login prior to the second time, wherein the first user does not provide the billing information after issuing the second user request.

\* \* \* \* \*